US009661607B2

(12) United States Patent
Iwai (10) Patent No.: US 9,661,607 B2
(45) Date of Patent: May 23, 2017

(54) PAGING AREA CONTROL APPARATUS, PAGING AREA CONTROL METHOD, TRANSFER APPARATUS, MOBILE COMMUNICATION SYSTEM, MOBILE STATION, AND COMPUTER READABLE MEDIUM

(71) Applicant: Takanori Iwai, Tokyo (JP)

(72) Inventor: Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/372,312

(22) PCT Filed: Nov. 9, 2012

(86) PCT No.: PCT/JP2012/007218
§ 371 (c)(1),
(2) Date: Jul. 15, 2014

(87) PCT Pub. No.: WO2013/108320
PCT Pub. Date: Jul. 25, 2013

(65) Prior Publication Data
US 2014/0364156 A1    Dec. 11, 2014

(30) Foreign Application Priority Data
Jan. 16, 2012   (JP) ................................. 2012-006346

(51) Int. Cl.
*H04W 68/00* (2009.01)
*H04W 68/06* (2009.01)
(Continued)

(52) U.S. Cl.
CPC ........... *H04W 68/06* (2013.01); *H04W 68/02* (2013.01); *H04W 68/08* (2013.01)

(58) Field of Classification Search
CPC ... H04W 68/00; H04W 68/005; H04W 68/02; H04W 68/04; H04W 68/06; H04W 68/08; H04W 68/10
(Continued)

(56) References Cited

U.S. PATENT DOCUMENTS 8,526,975 B2 *   9/2013   Bender ................. H04W 24/02
                                                          370/310
2004/0176024 A1 *  9/2004  Hsu ....................... H04L 12/189
                                                          455/3.04
(Continued)

FOREIGN PATENT DOCUMENTS

EP         0 732 863 A2      9/1996
JP         2005-20726        1/2005
(Continued)

OTHER PUBLICATIONS

International Search Report mailed Jan. 29, 2013.
(Continued)

*Primary Examiner* — Jean Gelin
(74) *Attorney, Agent, or Firm* — Finnegan, Henderson, Farabow, Garrett & Dunner, L.L.P.

(57) ABSTRACT

A transfer node (310) receives downlink data addressed to a mobile station (100). A paging area control apparatus (300) determines a paging area of the mobile station (100) based on an attribute of the downlink data. A paging apparatus (200) sends a paging signal into the paging area determined by the paging area control apparatus (300), in order to page the mobile station (100). As a result, a technology for contributing to determining a proper paging area corresponding to downlink traffic is provided.

37 Claims, 6 Drawing Sheets (51) Int. Cl.
*H04W 68/08* (2009.01)
*H04W 68/02* (2009.01)

(58) Field of Classification Search
USPC ... 455/422.1, 458, 459, 456.1, 432.3, 550.1, 455/414.1, 435.1, 443, 444
See application file for complete search history.

(56) References Cited

U.S. PATENT DOCUMENTS

| | | | |
|---|---|---|---|
| 2005/0003836 A1 | 1/2005 | Inoue et al. | |
| 2005/0089011 A1* | 4/2005 | Bender | H04W 24/02 370/349 |
| 2006/0178167 A1* | 8/2006 | Tamura | H04B 7/022 455/560 |
| 2007/0077947 A1 | 4/2007 | Rossetti | |
| 2007/0104156 A1 | 5/2007 | Inoue et al. | |
| 2008/0075178 A1* | 3/2008 | Lappetelainen et al. | 375/260 |
| 2008/0119209 A1* | 5/2008 | Upp | H04W 68/02 455/458 |
| 2008/0207229 A1* | 8/2008 | Cave | H04W 68/025 455/458 |
| 2010/0097974 A1* | 4/2010 | Ye | H04W 28/08 370/312 |
| 2010/0220680 A1 | 9/2010 | Ramankutty et al. | |
| 2010/0255840 A1* | 10/2010 | Itamiya et al. | 455/435.1 |
| 2011/0051668 A1* | 3/2011 | Lee | H04W 68/02 370/328 |
| 2011/0053591 A1* | 3/2011 | Kubo et al. | 455/435.1 |
| 2011/0117947 A1* | 5/2011 | Ishii et al. | 455/509 |
| 2012/0087313 A1 | 4/2012 | Yin et al. | |
| 2012/0157132 A1* | 6/2012 | Olsson | H04W 68/00 455/458 |
| 2013/0203450 A1* | 8/2013 | Mochizuki et al. | 455/458 |
| 2014/0031069 A1* | 1/2014 | Yang et al. | 455/458 |
| 2014/0302874 A1* | 10/2014 | Zakrzewski | 455/456.1 |

FOREIGN PATENT DOCUMENTS

| | | |
|---|---|---|
| JP | 2006-211335 | 8/2006 |
| JP | 2007-82142 | 3/2007 |
| JP | 2008-199395 | 8/2008 |
| JP | 2011-49616 | 3/2011 |
| WO | WO 2004/114703 A1 | 12/2004 |
| WO | WO 2008/126188 A1 | 10/2008 |
| WO | WO 2010/148964 A1 | 12/2010 |
| WO | WO 2011/026663 A2 | 3/2011 |

OTHER PUBLICATIONS

Extended European Search Report mailed Dec. 4, 2015 by the European Patent Office in counterpart European Patent Application No. 12865868.9.

* cited by examiner

| MSID (e.g. IMSI) | CHECK ITEM |
|---|---|
| ID1 | PROTOCOL TYPE |
| ID2 | SOURCE IP ADDRESS |
| ID3 | DATA SIZE |
| ID4 | SOURCE IP ADDRESS & PORT NUMBER |
| ⋮ | ⋮ |

Fig. 10

PAGING AREA CONTROL APPARATUS, PAGING AREA CONTROL METHOD, TRANSFER APPARATUS, MOBILE COMMUNICATION SYSTEM, MOBILE STATION, AND COMPUTER READABLE MEDIUM

CROSS-REFERENCE TO RELATED PATENT APPLICATIONS

This application is a National Stage Entry of International Application No. PCT/JP2012/007218, filed Nov. 9, 2012, which claims priority from Japanese Patent Application No. 2012-006346, filed Jan. 16, 2012. The entire contents of the above-referenced applications are expressly incorporated herein by reference.

TECHNICAL FIELD

The present invention relates to paging of a mobile station in a mobile communication system and, more particularly, to determination of an area where a paging signal is sent (hereinafter referred to as the paging area).

BACKGROUND ART

A multiple access mobile communication system enables a plurality of mobile stations to establish radio communication substantially simultaneously, by haring radio resources including at least one of time, frequency, and transmission power among the plurality of mobile stations. Typical examples of multiple access schemes include TDMA (Time Division Multiple Access), FDMA (Frequency Division Multiple Access), CDMA (Code Division Multiple Access), OFDMA (Orthogonal Frequency Division Multiple Access), and any combination thereof.

Unless noted otherwise, the term "a mobile communication system" used in the present specification refers to a multiple access mobile communication system. A mobile communication system includes mobile stations and an upper network. An upper network includes base stations, a relay node that relays traffic, and a control node that performs radio resource management, mobility management, bearer management and the like.

When new downlink traffic (downlink data or incoming voice call) to a mobile station in a standby state has arrived at an upper network, the upper network sends a paging signal to the mobile station. The mobile station in the standby state performs a discontinuous reception (DRX) for receiving a paging signal. In response to receiving the paging signal designated thereto, the mobile station starts initiates signaling in order to perform communication for receiving the downlink traffic. This signaling includes transmission of a response message to the paging. The response message includes one or both of a request for establishing a control connection and a service request for establishing a communication path (bearer) for user data. The network receives the response message and then performs procedures for establishing the control connection and the communication path (bearer) required for sending the downlink traffic to the mobile station.

Note that, to page a mobile station, the upper network has to determine an area where a paging signal is sent. In the present specification, "an area where a paging signal is sent" is referred to as "a paging area". A paging area includes at least one cell (or sector), and generally includes a plurality of cells (or sectors). Typically, a paging area for a mobile station is identical to the latest location registration area to which the mobile station belongs. The location registration area is a fundamental unit in the upper network for managing a location of the mobile station in the standby state. The mobile station sends a location update request to the upper network when the mobile station crosses over from one location registration area to another. Further, the mobile station may periodically send a location update request irrespective of occurrence of any change in the location registration area.

For example, in connection with the packet exchanged domain of the UMTS (Universal Mobile Telecommunications System) of the 3GPP (the 3rd Generation Partnership Project), the location registration area is referred to as a routing area (RA). Accordingly, paging of a mobile station in a standby state (CELL_PCH state or URA_PCH state) is generally performed by broadcasting a paging signal over the entire routing area.

Further, in the LTE (Long Term Evolution) of the 3GPP, the location registration area is referred to as a tracking area (TA). Accordingly, paging of a mobile station in a standby state (RRC_IDLE (ECM_IDLE) state) is generally performed by broadcasting a paging signal over the entire routing area.

Patent Literatures 1 and 2 disclose the technique of determining narrower paging area as compared to the normal location registration area through use of a movement history of a mobile station. By narrowing the paging area, the paging load on the mobile communication system can be reduced.

Patent Literature 1 discloses calculating a movement distance per unit time (i.e., a moving speed) of a mobile station using a history of location update requests sent from the mobile station, and determining, as the paging area, base stations within a circle having a radius equal to the calculated movement distance.

Patent Literature 2 discloses performing a location management of a mobile station using not only the location update requests but also GPS (Global Positioning System) location information. The method disclosed in Patent Literature 2 includes determining, when the latest location information of a mobile station obtained by the upper network is GPS location information, reduced paging area which is narrower than the location registration area based on the GPS location.

Further, Patent Literature 2 discloses calculating a moving speed of a mobile station using a history of location update messages and that of GPS location information, and increasing the paging area as the moving speed of the mobile station becomes larger. Specifically, in order to enlarge the paging area, an identifier for specifying the paging area is changed in order of a sector identifier, a radio network controller (RNC) identifier, and a routing area indicator (RAI).

CITATION LIST

Patent Literature

[Patent Literature 1] Japanese Unexamined Patent Application Publication No. 2011-49616
[Patent Literature 2] Japanese Unexamined Patent Application Publication No. 2006-211335
[Patent Literature 3] Japanese Unexamined Patent Application Publication No. 2005-20726

SUMMARY OF INVENTION

Technical Problem

The inventor of the present application has found a problem in conventional paging area determining schemes that the paging area corresponding to downlink traffic may not be properly determined. This problem is described in the following.

In general, the paging load can be reduced by narrowing the paging area. However, narrowing the paging area invites an increase in the paging failure rate. Accordingly, as to some type of downlink traffic (e.g., traffic of high urgency), it may be preferable to perform paging with low paging failure rate, sacrificing the paging load thereto.

Further, a usage scenario in which the MTC (Machine Type Communication) is accommodated in a mobile communication system is known. The MTC is also referred to as the M2M network or the sensor network. In the case of accommodating the MTC in a mobile communication system, functions of a mobile station are arranged in a machine (e.g., a vending machine, a gas meter, an electricity meter, an automobile, or a railway vehicle) and a sensor (e.g., a sensor relating to environment, agriculture, or transportation).

It is expected that a mobility characteristic greatly differs between a conventional mobile station carried by a person such as a mobile phone, a smartphone, a tablet computer and the like (i.e., a mobile communication terminal) and a mobile station used in the MTC. Further, in the MTC itself, the mobility characteristic greatly differs between a statically installed device such as a vending machine, a gas meter and the like, and a transportation machine such as an automobile, a railway vehicle and the like. Still further, in the transportation machine category itself, it is expected that the mobility characteristic greatly differs between an automobile and a railway vehicle. Here, the mobility characteristic includes at least one of presence/absence of mobility, a moving speed, a moving direction, a restriction on a range of movement, a randomness of movement, and a repetitiveness of movement. Accordingly, when a content of downlink traffic is associated with a type of a mobile station (e.g., whether it is MTC or not) or a mobility characteristic of a mobile station, a paging area may be possibly determined properly by taking into account of the content of the downlink traffic.

Though Patent Literatures 1 and 2 disclose that the size of the paging area is changed in accordance with a moving speed of a mobile station, they are silent about consideration of the content of downlink traffic. Further, Patent Literature 3 discloses determining a paging area of a mobile station according to a communication state (e.g., communication amount) or an operating state (e.g., movement frequency) of the mobile station. Specifically, a mobility management node arranged at a core network of Patent Literature 3 receives a control packet (a paging request packet) sent from a mobile station, and determines a paging area of the mobile station in accordance with the communication state of the mobile station or the operating state of the mobile station indicated by the control packet. However, Patent Literature 3 also is silent about consideration of a content of downlink traffic addressed to a mobile station in determining a paging area.

The present invention has been made based on the above-mentioned findings of the inventor. That is, an object of the present invention is to provide a paging area control apparatus, a paging area control method, a transfer apparatus, a mobile communication system, a mobile station, and a program that are capable of contributing to determining a proper paging area corresponding to downlink traffic.

Solution to Problem

A first aspect of the present invention includes a paging area control apparatus. The paging area control apparatus includes a PA determining unit. The PA determining unit determines a paging area of a mobile station based on an attribute of downlink data addressed to the mobile station.

A second aspect of the present invention includes a paging area control method. The method includes determining a paging area of a mobile station based on an attribute of downlink data addressed to the mobile station.

A third aspect of the present invention includes a transfer apparatus. The transfer apparatus includes a transfer unit and control unit. The transfer unit receives downlink data addressed to a mobile station. The control unit sends a notification indicating an attribute of the downlink data to a paging area control apparatus, in order to request paging of the mobile station.

A fourth aspect of the present invention includes a mobile communication system. The system includes a transfer apparatus, a paging area control apparatus and a paging apparatus. The transfer apparatus receives downlink data addressed to a mobile station. The paging area control apparatus determines a paging area of the mobile station based on an attribute of the downlink data. The paging apparatus sends a paging signal into the paging area, in order to page the mobile station.

A Fifth aspect of the present invention includes a mobile station that is used in the mobile communication system according to the fourth aspect described above and configured to initiate communication in response to the paging signal.

A sixth aspect of the present invention includes a program causing a computer to perform the method according to the second aspect described above.

Advantageous Effects of Invention

According to the above-mentioned aspects, it is possible to provide a paging area control apparatus, a paging area control method, a transfer apparatus, a mobile communication system, a mobile station, and a program that are capable of contributing to determining a proper paging area corresponding to downlink traffic.

DESCRIPTION OF EMBODIMENTS

Hereinafter, exemplary embodiments will be described in detail with reference to the drawings. In the drawings, the same or corresponding elements are denoted by the same reference numerals, and a repeated explanation is omitted as needed for clarity of the explanation.

First Embodiment

Figure 1:
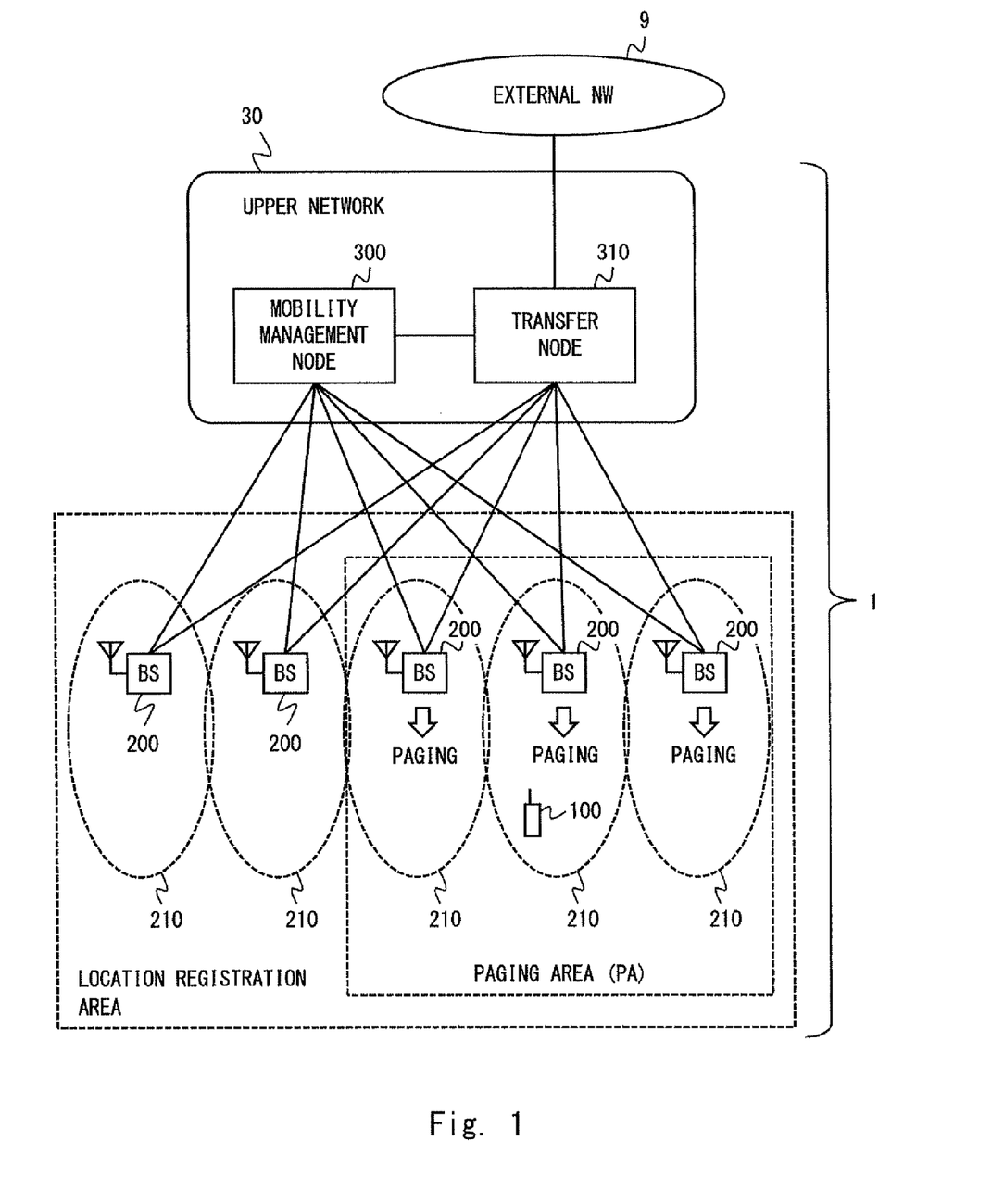
FIG. 1 is a diagram showing a configuration example of a mobile communication system according to a first embodiment of the present invention.

FIG. 1 is a block diagram showing a configuration example of a mobile communication system 1 according to the present embodiment. The mobile communication system 1 includes a mobile station 100, a plurality of base stations 200, and an upper network 30. Note that, though FIG. 1 shows only one mobile station 100 for the sake of convenience, the system 1 may include a plurality of mobile stations 100. Each of the base stations 200 generates a cell 210, and establishes a connection with the mobile station 100 by means of a radio access technology to relay user data between the mobile station 100 and the upper network 30.

The upper network 30 is communicatively connected to the base stations 200. The upper network 30 has a function of relaying user data transferred between the mobile station 100 and an external network 9. Further, the upper network 30 performs management of subscriber information and mobility management for the mobile station 100. The mobility management includes location management of the mobile station 100, and control of paging to the mobile station 100 in the standby state. The upper network 30 is a network mainly administrated by a mobile operator providing the mobile communication service. For example, the upper network 30 includes a core network (e.g., the EPC (Evolved Packet Core) of the LTE, the UMTS packet core). Further, the upper network 30 may include nodes (e.g., the RNC) of a radio access network excluding the plurality of base stations 200.

In the example shown in FIG. 1, the upper network 30 includes a mobility management node 300 and a transfer node 310. The transfer node 310 is a user-plane node, and performs transfer processing (e.g., routing and forwarding) of user data. Note that, the transfer node 310 may include a plurality of transfer nodes. For example, in the case of the UMTS, the transfer node 310 includes the user-plane function of the SGSN (Serving GPRS Support Node) and the user-plane function of the GGSN (Gateway GPRS Support Node). Further, in the case of the LTE, the transfer node 310 includes the S-GW (Serving Gateway) and the P-GW (Packet Data Network Gateway).

The mobility management node 300 is a control-plane node, and performs mobility management including control of paging to the mobile station 100. For example, in the case of the UMTS, the mobility management node 300 includes the control-plane function of the SGSN. Further, in case of the LTE, the mobility management node 300 includes the MME (Mobility Management Entity).

In the present embodiment, the mobility management node 300 performs the following processing as to the control of paging to the mobile station 100. That is, the mobility management node 300 determines the paging area (PA) of a mobile station 100 based on the attribute of downlink data (DD) addressed to the mobile station 100. When downlink data to be sent to the mobile station 100 in the standby state arrives at the upper network 30, the mobility management node 300 instructs at least one base station within the determined PA out of the plurality of base stations 200 to send a paging signal. The base station 200 receives the paging instruction from the mobility management node 300, and then transmits a paging signal using a downlink channel. Note that, in the UMTS, an RNC sends a paging signal through the base stations 200. Accordingly, the mobility management node 300 may request an RNC to send a paging signal. Further, if a paging fails, the mobility management node 300 may repeatedly perform paging while changing the paging area.

The mobility management node 300 may change the paging area (PA) determining algorithm in accordance with the downlink data attribute. Specifically, the mobility management node 300 may select an algorithm used in determining the PA of the mobile station 100 from a plurality of PA determining algorithms, in accordance with the attribute of downlink data addressed to the mobile station 100. Then, the mobility management node 300 may determine the PA of the mobile station 100 using the selected PA determining algorithm. That is, the paging area corresponding to the downlink data attribute is determined by changing the PA determining algorithm based on the downlink data attribute.

There may be a wide variety of downlink data (DD) attributes used in determining the PA. However, the present embodiment excludes the case where the downlink data attribute, used in determining the PA, consists of only the identifier of a mobile station 100 as the destination of downlink data. Note that, in order to determine the PA, the present embodiment may use the identifier of the mobile station 100 in combination with other attribute of downlink data.

For example, the mobility management node 300 may use a downlink data attribute relating to urgency or delay tolerance of downlink data. The mobility management node 300 may determine a sufficiently large paging area in order to reduce paging failure rate, when downlink data of high urgency arrives. On the other hand, the mobility management node 300 may determine a small paging area when downlink data with high delay tolerance arrives, because a delay caused by a paging failure can be tolerated.

Further, the mobility management node 300 may use a downlink data attribute relating to a mobility characteristic of the mobile station 100. The mobility characteristic of the mobile station 100 includes, for example, at least one of presence/absence of mobility, a moving speed, a moving direction, a restriction on a range of movement, a randomness of movement, and a repetitiveness of movement, each relating to the mobile station 100. For example, the mobility management node 300 may determine the paging area corresponding to the mobility characteristic of the mobile station 100.

The presence/absence of mobility means whether the mobile station 100 has substantial mobility. For example, in the case where the mobile station 100 is mounted on a statically installed device such as a vending machine and a gas meter, the mobile station 100 does not have substantial mobility. When it is determined that the mobile station 100 has no mobility based on an attribute of downlink data, the mobility management node 300 may determine, as the PA, just one cell that includes the latest location of the mobile station 100 (e.g., a base station 200 to which the mobile station 100 belongs, a cell 210 to which the mobile station 100 belongs, or the location obtained by GPS).

The restriction on a range of movement means that any restriction is placed on a geographical range in which the mobile station 100 can substantially move. For example, when the mobile station 100 is mounted on a railway vehicle, a geographical range in which the mobile station 100 can substantially move is restricted to a one-dimensional region along a railroad. When determining the presence of such a restriction on a range of movement based on the downlink data attribute, the mobility management node 300 may determine the PA in the following manner. That is, the mobility management node 300 may specify a geographical region whose dependence on the moving direction of the mobile station 100 is large, and then select, as the PA, a base station(s) 200 that is within the specified geographical region or a cell(s) 210 that at least partially overlaps with the specified geographical region.

The randomness of movement means that a moving direction of the mobile station 100 changes randomly irrespective of the past movement history. In other words, it means that there is no substantial regularity in a movement trajectory of the mobile station 100. The repetitiveness of movement is the concept being opposite to the randomness of movement, and means that there is any regularity in the moving direction or movement trajectory of the mobile station 100. When determining the presence of such a randomness of movement based on the downlink data attribute, the mobility management node 300 may determine the PA in the following manner. That is, the mobility management node 300 specifies a geographical region whose dependence on the moving direction of the mobile station 100 is small and whose area size is variable, and selects, as the PA, a base station(s) 200 that is within the geographical region or a cell(s) 210 that at least partially overlaps with the geographical region. The geographical region whose dependence on the moving direction is small is, for example, a circular region. The size of the geographical region may be determined in accordance with the moving speed of the mobile station 100. For example, the mobility management node 300 may use the PA determining scheme disclosed in Patent Literature 1 or 2.

In the following, specific examples of the downlink data attribute used in determining PA are shown. The downlink data attribute used in determining PA may include at least one of a data type, a protocol type, a port number, transmission source identifier, and a data size. The data type includes, for example, an emergency alert, voice, mail, a movie, http (Hypertext Transfer Protocol) data, SMS (Short Message Service) and the like. These data types are related to urgency or delay tolerance or downlink data.

The emergency alert (e.g., Earthquake Early Warning) is of the highest urgency and with little delay tolerance as compared to other data types. Accordingly, when the emergency alert arrives, the mobility management node 300 may determine a sufficiently large paging area including the current location registration area (e.g., the routing area (RA), the tracking area (TA)) of the mobile station 100.

Next, though not being comparable to the emergency alert, the voice data is of higher urgency and with smaller delay tolerance as compared to other data types. Accordingly, when the voice data arrives, the mobility management node 300 may determine the paging area including the current location registration area of the mobile station 100 and a location registration area adjacent thereto.

Then, the mail data is of lower urgency and with larger delay tolerance as compared to other data types. Accordingly, when the mail data arrives, the mobility management node 300 may determine, as the paging area, a base station(s) 200 or a cell(s) 210 within a predetermined distance from the center of the current location registration area of the mobile station 100.

When movie data arrives, the mobility management node 300 may estimate the moving range of the mobile station using the movement history of the mobile station 100, and determine the moving range as the paging area.

When http data arrives, the mobility management node 300 determines just the cell 210 to which the mobile station 100 has connected last as the paging area.

The protocol type and the port number are each a specific example of the attribute that can be used for specifying the data type. When downlink data is IP (Internet Protocol) packet data, the protocol type corresponds to the protocol number given to an IP (Internet Protocol) packet. Further, the port number corresponds to the TCP (Transmission Control Protocol) port number.

The transmission source identifier identifies the transmission source of downlink data. When downlink data is IP packet data, the transmission source identifier corresponds to a source IP address. For example, specific transmission source identifier, e.g., source IP addresses, subnets, or domains may be previously registered. When the transmission source of downlink data agrees with the registered identifier, the mobility management node 300 may determine the paging area corresponding to that identifier. As specific example, transmission source identifier pertaining to MTC, e.g., IP addresses, subnets, or domains corresponding to a system of monitoring vending machines or sensors may be previously registered. Then, when downlink data having such transmission source identifier arrives, the mobility management node 300 may determine only the cell 210 to which the mobile station 100 has connected last as the paging area. This is because the mobile station 100 mounted on any vending machine or sensor is considered to have substantially no mobility.

The data size means the size (data amount) of the entire downlink data, or part of downlink data (e.g., the payload part excluding the header). The mobility management node 300 may change the size of the paging area of the mobile station 100 in accordance with the data size of downlink data addressed to the mobile station 100. It is expected that some mobile operators perform operation including storing downlink data until paging of the mobile station 100 succeeds. Therefore, if the data size of downlink data is large, storing of the data for a long period may cause an increase in the load on the network. Accordingly, for example when the data size of the downlink data of the mobile station 100 is large, the mobility management node 300 may enlarge the paging area of the mobile station 100 in order to increase the paging success rate. Conversely, when the data size of the mobile station 100 is small, the mobility management node 300 may reduce the paging area of the mobile station 100 because the load on the network to send the control message may become disadvantageously high. In other words, the mobility management node 300 may enlarge the paging area of the mobile station 100 as the data size of the downlink data to the mobile station 100 is larger. Note that, as described above, the mobility management node 300 may change the paging area determining algorithm in accordance with the downlink data size so as to change the size of the paging area in accordance with the data size of the downlink data.

Subsequently, a description will be given of the selection of the paging area. FIG. 1 shows the case of determining, as the PA, an area that is within one location registration area (e.g., the routing area (RA) or the tracking area (TA)) to which a mobile station 100 belongs. Specifically, at least one base station 200 (or at least one cell 210) is selected as the PA from a plurality of base stations 200 (or a plurality of cells 210) within the location registration area to which the mobile station 100 in the standby state belongs.

However, for example the LTE allows one mobile station 100 to belong to a plurality of TAs. Accordingly, the mobility management node 300 may select, as the PA with which transmission of a paging signal is performed, at least one TA from a plurality of TAs to which the mobile station 100 belongs, in accordance with the PA determining algorithm applied to the mobile station 100.

Further, the mobility management node 300 may determine the PA independently of the location registration area to which the mobile station 100 in the standby state belongs. In some cases, the mobility management node 300 can obtain the latest location of the mobile station 100 in the standby state more specifically than the location registration area. For example, the mobility management node 300 can receive a location update request (e.g., a TAU (Tracking Area Update) request of the LTE or a RAU (Routing Area Update) request of the UMTS) that is periodically sent from the mobile station 100. In this case, the mobility management node 300 can obtain the latest location of the mobile station 100 by the base station 200 (or the cell 210) having received the location update request. Further, in some cases, the mobility management node 300 can use the location information of the mobile station 100 obtained by GPS. In such cases, the mobility management node 300 may determine the geographical region that includes the latest location of the mobile station 100 (e.g., the base station 200, the cell 210, the location obtained by GPS) by the PA determining algorithm, and select at least one base station 200 or cell 210 within the geographical region as the PA.

Figure 2:
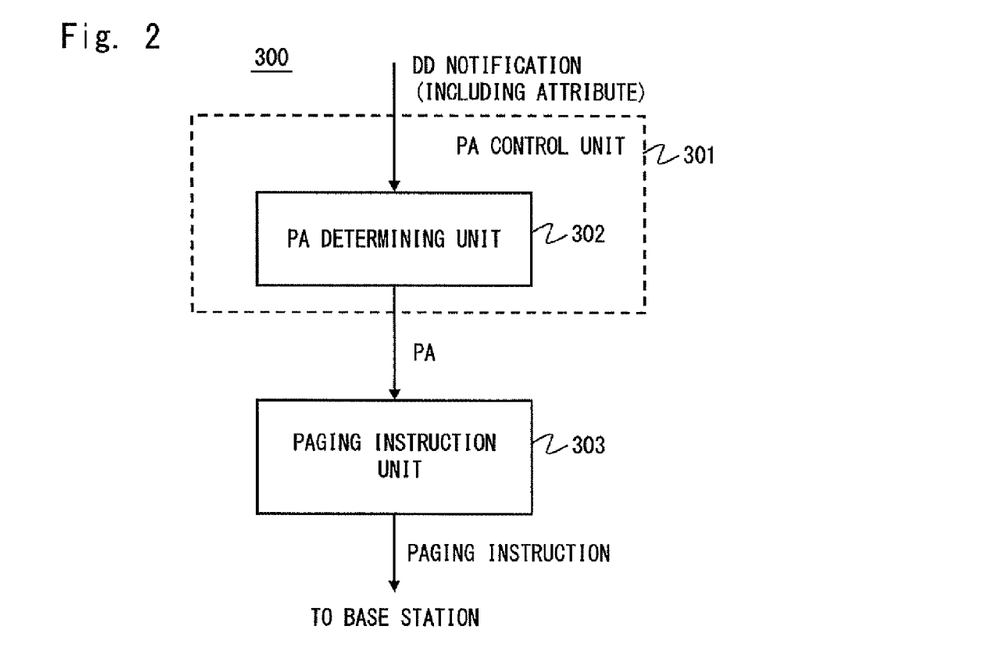
FIG. 2 is a diagram showing a configuration example of a mobility management node according to the first embodiment of the present invention.

Subsequently, a description will be given of a specific example of the structure and operation of the mobility management node 300 and the transfer node 310. FIG. 2 is a block diagram showing a configuration example of the mobility management node 300. Note that, FIG. 2 shows the elements relating to the paging control out of the functions of the mobility management node 300. The configuration example shown in FIG. 2 includes a paging area (PA) control unit 301 and a paging instruction unit 303. The PA control unit 301 includes a PA determining unit 302. The PA determining unit 302 receives a downlink data (DD) notification from the transfer node 310 having received downlink data addressed to a mobile station 100 in the standby state. Then, the PA determining unit 302 determines the PA of the mobile station 100 using downlink data (DD) attribute included in the downlink data (DD) notification.

The paging instruction unit 303 sends a paging instruction to the base station(s) 200 (or a control apparatus of the radio access network such as the RNC) within the PA that is determined by the PA determining unit 302. The paging instruction includes a mobile station identifier (hereinafter referred to as the MSID) for specifying the mobile station 100 as the paging target. The MSID included in the paging instruction is, for example, TMSI (Temporary Mobile Subscriber Identity), P-TMSI (Packet TMSI), M-TMSI (MME-TMSI), GUTI (Globally Unique Temporary ID), or IMSI (International Mobile Subscriber Identity).

Figure 3:
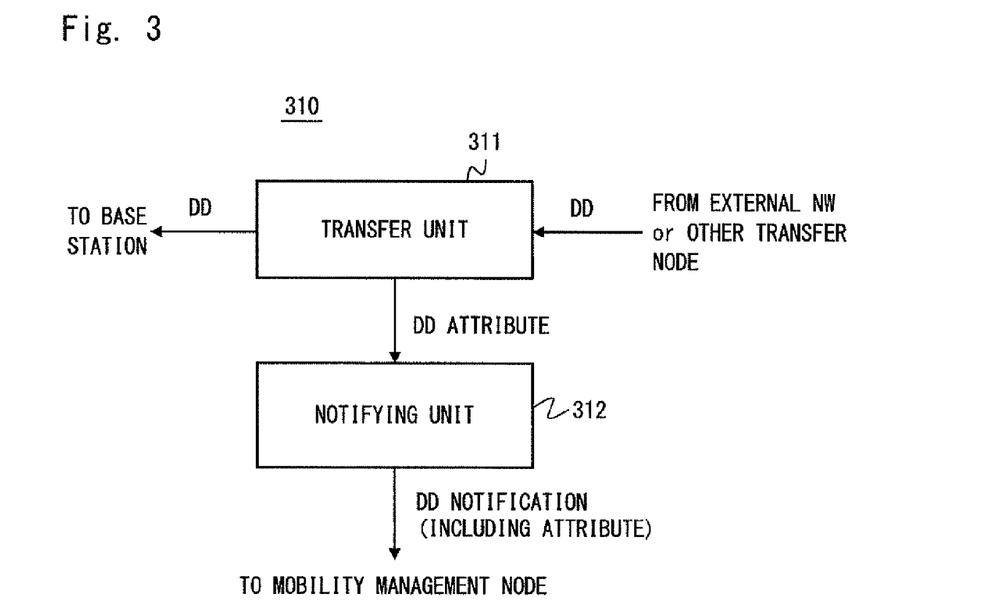
FIG. 3 is a diagram showing a configuration example of a transfer node according to the first embodiment of the present invention.

FIG. 3 is a block diagram showing a configuration example of the transfer node 310. Note that, FIG. 3 shows the elements relating to the paging control out of the functions of the transfer node 310. The transfer unit 311 receives downlink data addressed to a mobile station 100 from the external network 9 or other transfer node. Further, the transfer unit 311 transfers the downlink data addressed to the mobile station 100 to the base station 200 to which the mobile station 100 is being connected (or a control apparatus of a radio access network such as the RNC). Further, when the transfer unit 311 has received downlink data addressed to the mobile station 100 in the standby state, the transfer unit 311 supplies an attribute of the downlink data to a notifying unit 312.

The notifying unit 312 sends to the mobility management node 300 a notification (downlink data notification) indicating arrival of the downlink data addressed to the mobile station 100 in the standby state. The downlink data notification includes the downlink data attribute.

Figure 4:
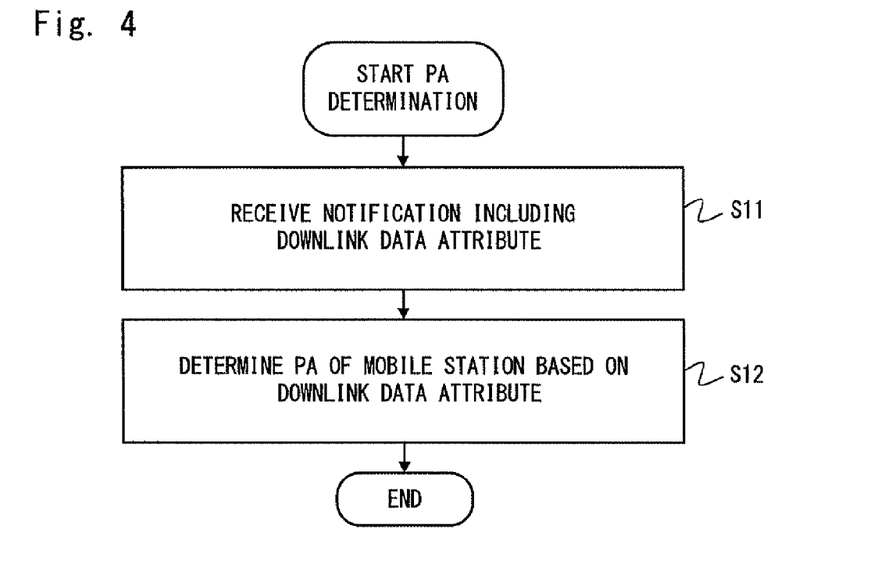
FIG. 4 is a flowchart showing one example of a paging area determining procedure according to the first embodiment of the present invention.

FIG. 4 is a flowchart showing one example of the paging area (PA) determining procedure performed by the mobility management node 300. In Step S11, the mobility management node 300 receives a downlink data notification indicating arrival of downlink data addressed to the mobile station 100 from the transfer node 310. The downlink data notification includes a downlink data attribute. In Step S12, the mobility management node 300 determines the paging area (PA) of the mobile station 100 based on the downlink data attribute.

Figure 5:
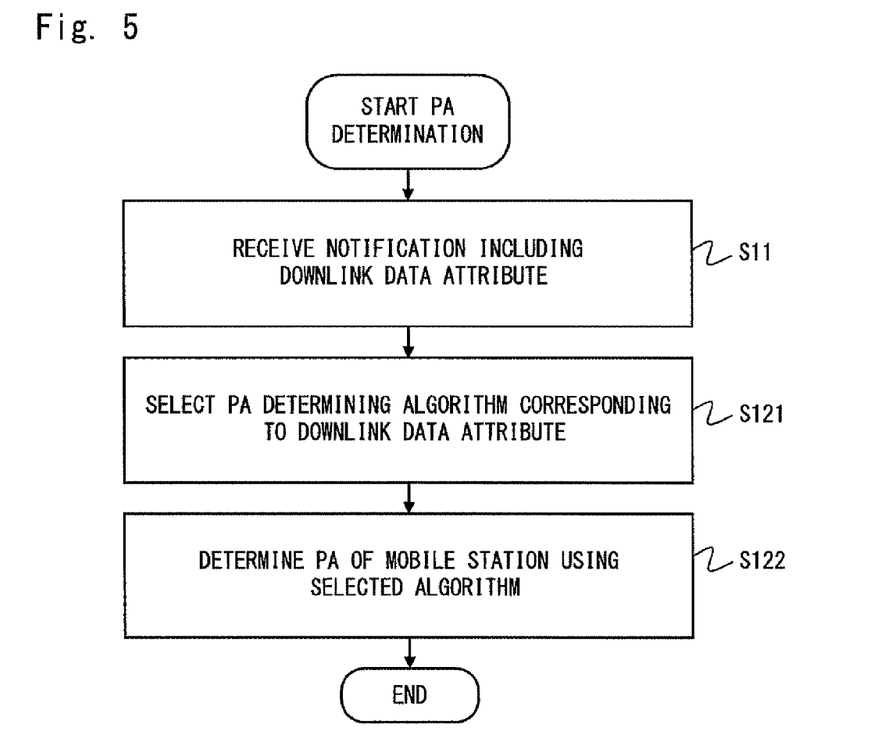
FIG. 5 is a flowchart showing other example of a paging area determining procedure according to the first embodiment of the present invention.

The determination of the paging area based on the downlink data attribute in Step S12 shown in FIG. 4 may be made by specifying a PA determining algorithm corresponding to the downlink data attribute, as described above. FIG. 5 is a flowchart showing such a variation. In Step S121 shown in FIG. 5, the mobility management node 300 selects a PA determining algorithm corresponding to the downlink data attribute. In Step S122, the mobility management node 300 determines the paging area of the mobile station 100 using the selected algorithm.

Figure 6:
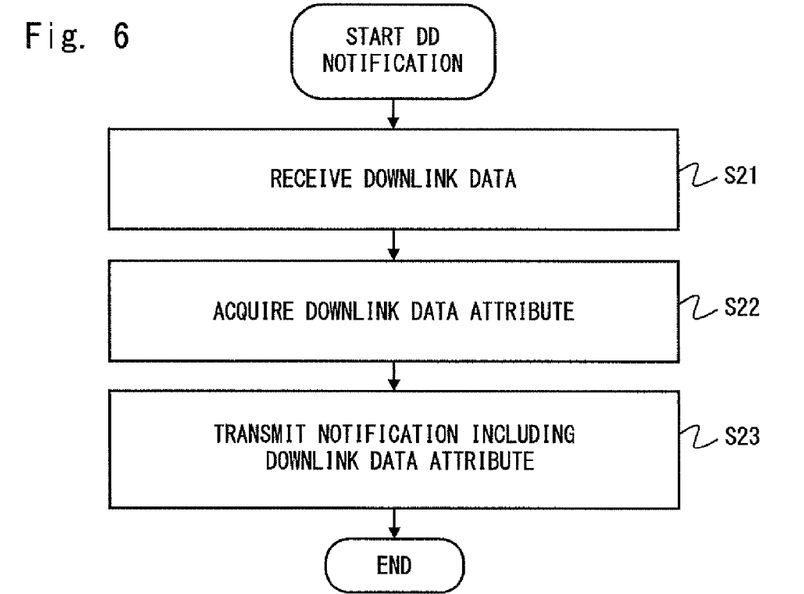
FIG. 6 is a flowchart showing one example of a downlink data notifying procedure according to the first embodiment of the present invention.

FIG. 6 is a flowchart showing one example of a downlink data notifying procedure performed by the transfer node 310. In Step S21, the transfer node 310 receives the downlink data addressed to the mobile station 100 in the standby state. In Step S22, the transfer node 310 acquires a downlink data attribute from the received downlink data. In Step S23, the transfer node 310 sends a downlink data notification indicating the downlink data attribute to the mobility management node 300.

Figure 7:
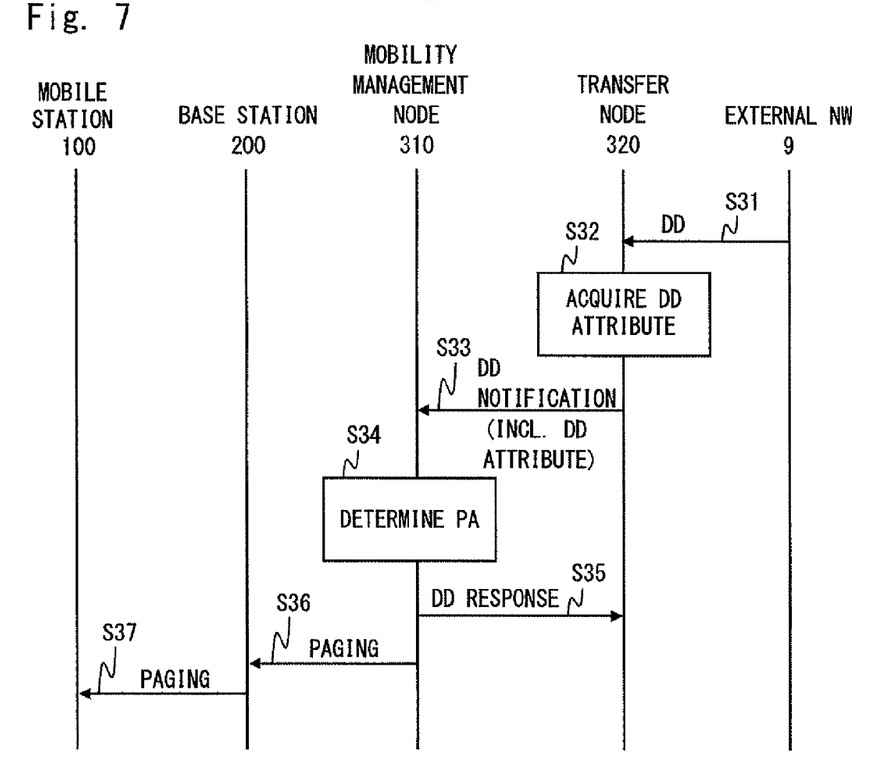
FIG. 7 is a sequence diagram showing one example of a paging procedure according to the first embodiment of the present invention.

FIG. 7 is a sequence diagram showing one example of a paging procedure according to the present embodiment. Steps S31, S32, S33, and S34 in FIG. 7 respectively correspond to Steps S21, S22, S23, and S12 described above. In Step S35, the mobility management node 300 sends a response indicating a reception of the downlink data notification to the transfer node 310. In Step S36, in response to the arrival of downlink traffic addressed to the mobile station 100 in the standby state at the upper network 30, the mobility management node 300 sends a paging instruction to the base station(s) 200 within the PA of the mobile station 100. In Step S37, the base station(s) 200 sends a paging signal into the cell(s) 210 based on the paging instruction.

As described above, in the present embodiment, the paging area of the mobile station 100 is determined introducing the new index which is the attribute of the downlink data. Accordingly, the present embodiment can contribute to determining a proper paging area corresponding to downlink traffic. As has been described already, the urgency and delay tolerance of downlink data greatly vary. Further, considering the various use cases of the mobile station 100 including MTC (Machine Type Communication), the mobility characteristic of the mobile station 100 may greatly differ depending on a use case thereof. The present embodiment can also contribute to determining a proper paging area corresponding to the urgency and delay tolerance of downlink data or the mobility characteristic of a mobile station by using the correspondence between the urgency and delay tolerance of downlink data and the downlink data attribute, or the correspondence between the mobility characteristic of the mobile station 100 and the downlink data attribute.

Second Embodiment

Figure 8:
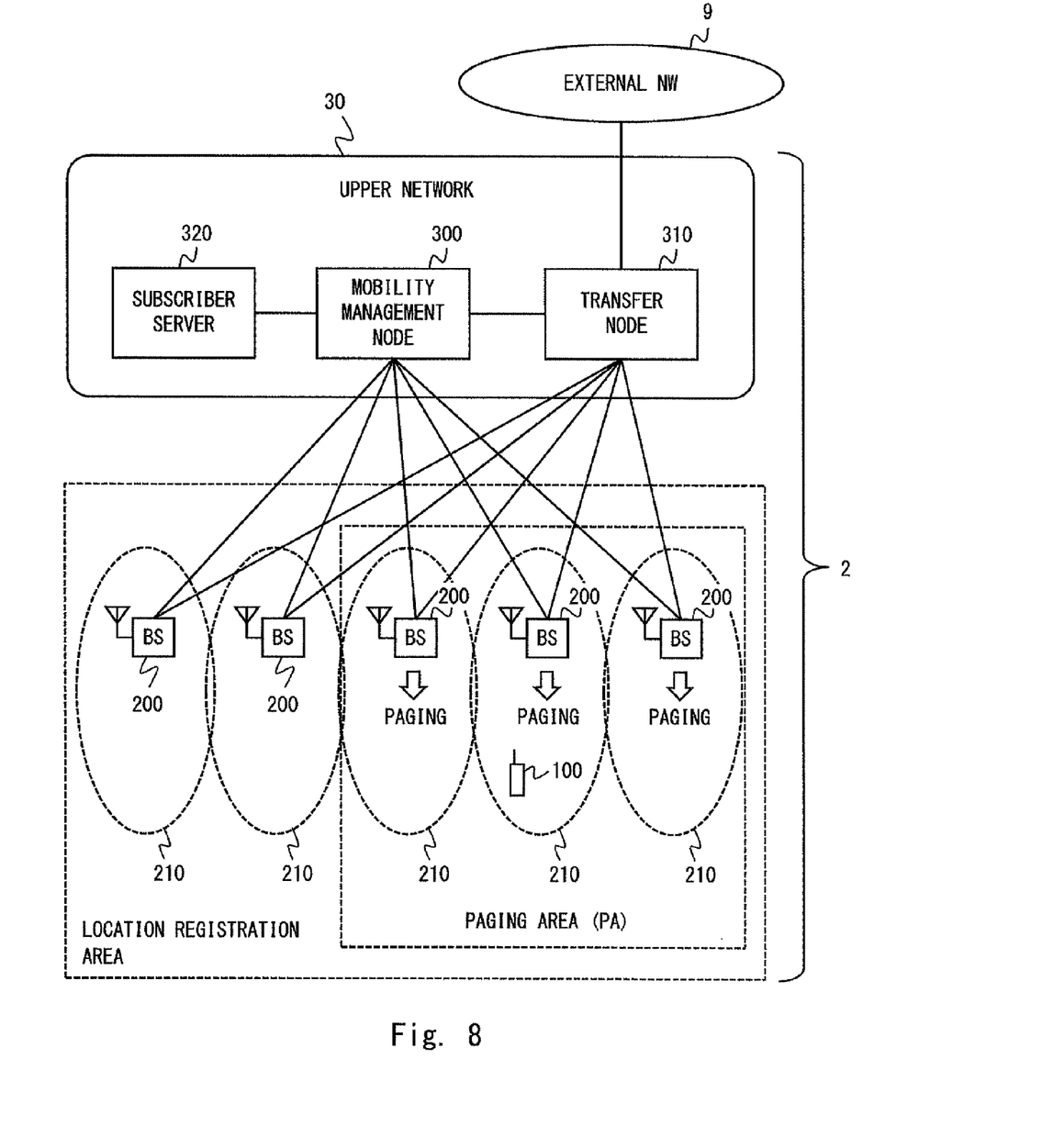
FIG. 8 is a configuration example showing a mobile communication system according to a second embodiment of the present invention.

In the present embodiment, a description will be given of a variation of the first embodiment of the invention described above. FIG. 8 is a block diagram showing a configuration example of a mobile communication system 2 according to the present embodiment. The upper network 30 shown in FIG. 2 includes a subscriber server 320.

The subscriber server 320 according to the present embodiment is an apparatus that retains the subscriber information of the mobile station 100. For example, an HSS (Home Subscriber Server) or an HLR (Home Location Server) corresponds thereto. The subscriber information retained by the subscriber server 320 according to the present embodiment includes an "attribute of downlink data that should be used in determining the PA". The mobility management node 300 according to the present embodiment determines the paging area based on the "attribute of downlink data that should be used in determining the PA" retained in the subscriber server 320, when downlink data addressed to the mobile station 100 arrives. That is, the mobility management node 300 according to the present embodiment can use a different downlink data attribute in determining the paging area for each mobile station 100.

Specifically, in order to select an attribute, to be used in determining the paging area (PA), from a plurality of attributes (e.g., the data type, the transmission source identifier, the data size) relating to downlink data, the mobility management node 300 sends a query to the subscriber server 320. Then, the mobility management node 300 selects the attribute, to be used in determining the PA, from the plurality of attributes relating to the downlink data, based on subscriber information on the mobile station 100 received from the subscriber server 320.

Figure 9:
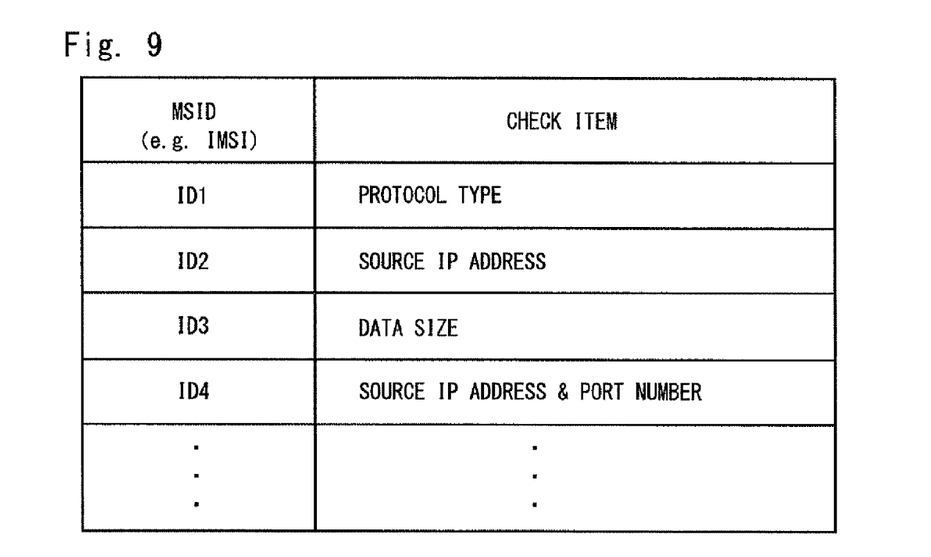
FIG. 9 is a diagram showing one example of information retained by a subscriber server according to the second embodiment of the present invention.

FIG. 9 shows specific examples of the "attribute of downlink data that should be used in determining the PA" retained by the subscriber server 320. The "check item" shown in FIG. 9 corresponds thereto. As shown in FIG. 9, the subscriber server 320 may retain the check item for each mobile station 100 in association with the mobile station identifier (MSID). In some cases, the MSID is referred to as the subscriber identifier. The MSID is, for example, the IMSI. In the example of FIG. 9, the protocol type is used as the "attribute of downlink data that should be used in determining the PA" for downlink data addressed to the mobile station 100 whose MSID is ID1.

The timing at which the mobility management node 300 acquires the check item (i.e., the downlink data attribute that should be used in determining the PA) relating to the mobile station 100 is not particularly limited. For example, the mobility management node 300 may send a check item request to the subscriber server 320 during the attach procedure or location update procedure of the mobile station 100. In this case, the check item request may also serve as a location update request (e.g., a TAU request, an RAU request). Alternatively, the mobility management node 300 may send a request for the check item (i.e., the downlink data attribute that should be used in determining the PA) to the subscriber server 320 in response to a reception of a downlink data notification from the transfer node 310.

The mobility management node 300 may notify the transfer node 310 about the attribute of downlink data required for the mobile station 100. In this case, the transfer node 310 may include only the attribute of downlink data designated by the mobility management node 300 in the downlink data notification. Thus, a reduction in the data size of the downlink data notification can be expected.

Figure 10:
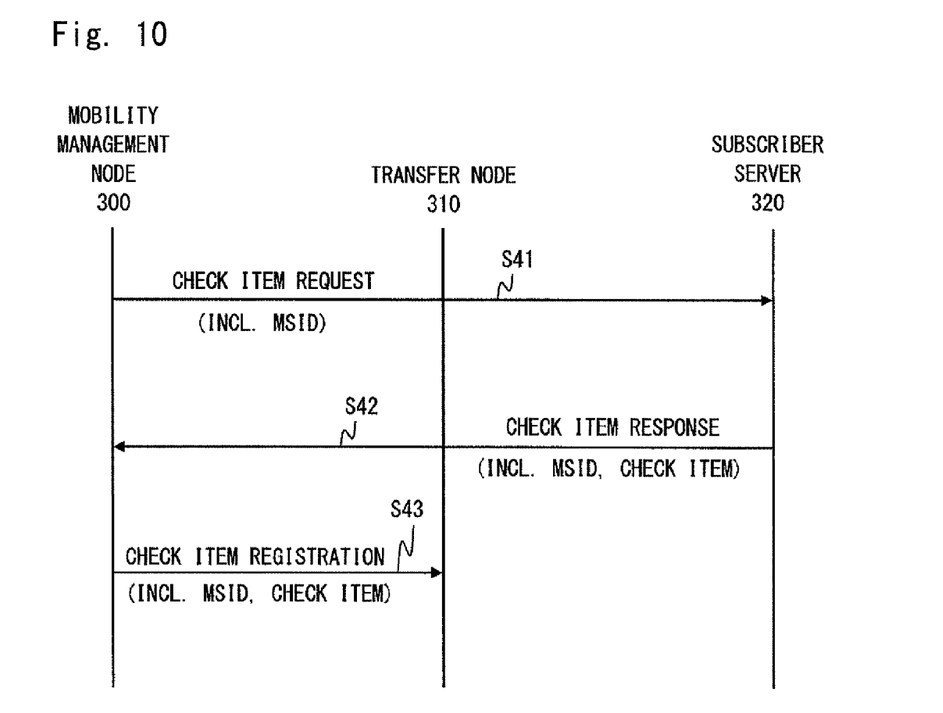
FIG. 10 is a sequence diagram showing one example of a registration procedure of a check item (a downlink data attribute that should be used in determining the PA) according to the second embodiment of the present invention.

The sequence diagram of FIG. 10 shows one example of a registration procedure of the check item (i.e., the downlink data attribute that should be used in determining the PA) to the transfer node 310. In Step S41, the mobility management node 300 sends a check item request to the subscriber server 320. The check item request includes the MSID of the mobile station 100 (which is the ID managed by the subscriber server 320, e.g., the IMSI). The request sent in Step S41 is, for example a location update request (e.g., a TAU request, a RAU request).

In Step S42, the mobility management node 300 receives the check item (i.e., the attribute of downlink data that should be used in determining the PA) relating to the mobile station 100 from the subscriber server 320. In Step S43, the mobility management node 300 sends the check item relating to the mobile station 100 to the transfer node 310. The transfer node 310 may sends to the mobility management node 300 a downlink data notification indicating at least the attribute designated by the check item, when downlink data addressed to the mobile station 100 arrives.

Other Embodiments

The determination of the paging area based on the downlink data attribute described in the first and second embodiments of the invention, that is, the function of the PA control unit 301 shown in FIG. 2 may be arranged as being separated from the mobility management node 300 that performs the paging instruction (i.e., the instruction unit 303 shown in FIG. 2). The arrangement of this function may be determined as appropriate in accordance with the architecture and standards and the like of the mobile communication system.

The processes performed by the mobility management node 300 and the transfer node 310 described in the first and second embodiments of the invention may be implemented by using a semiconductor processing device including an ASIC (Application Specific Integrated Circuit). Further, such processes may be implemented by causing a computer such as a microprocessor, a DSP (Digital Signal Processor) and the like to execute a program. Specifically, one or more programs including instructions for causing a computer to execute the algorithms which have been described with reference to the flowcharts and the sequence diagrams may be created and supplied the program(s) to the computer.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

Furthermore, the invention is not limited to the embodiments described above, and it will be obvious that various modifications may be made therein without departing from the spirit and scope of the present invention described above This application is based upon and claims the benefit of priority from Japanese patent application No. 2012-6346, filed on Jan. 16, 2012, the disclosure of which is incorporated herein in its entirety by reference.

REFERENCE SIGNS LIST 1, 2 MOBILE COMMUNICATION SYSTEM
9 EXTERNAL NETWORK
30 CORE NETWORK
100 MOBILE STATION
200 BASE STATION
210 CELL
300 MOBILITY MANAGEMENT NODE
301 PAGING AREA (PA) CONTROL UNIT
302 PAGING AREA (PA) DETERMINING UNIT
303 PAGING INSTRUCTION UNIT
310 TRANSFER NODE
311 TRANSFER UNIT
312 NOTIFYING UNIT
320 SUBSCRIBER SERVER

The invention claimed is:

1. A paging area control apparatus comprising:
a memory device that stores instructions; and
at least one processor configured to execute the instructions to:
transmit a query to a subscriber server;
receive a response from the subscriber server;
select, based on the response, an attribute type to be used in determining a paging area, the attribute type being selected from a plurality of attribute types relating to downlink data, the downlink data being received by a transfer node;
determine an attribute value corresponding to the selected attribute type of the downlink data addressed to a mobile station; and
determine a paging area of the mobile station based on the attribute value.

2. The paging area control apparatus according to claim 1, wherein the selected attribute type of the downlink data is separate from an identifier of the mobile station as a destination of the downlink data.

3. The control apparatus according to claim 1, wherein the at least one processor is further configured to execute the instructions to:
select an algorithm used for determining the paging area based on the attribute value of the downlink data; and
determine the paging area using the selected algorithm.

4. The control apparatus according to claim 1, wherein the selected attribute type of the downlink data includes a data type.

5. The control apparatus according to claim 1, wherein the selected attribute type of the downlink data includes at least one of a protocol type and a port number.

6. The control apparatus according to claim 1, wherein the selected attribute type of the downlink data includes a transmission source identifier.

7. The control apparatus according to claim 1, wherein the selected attribute type of the downlink data includes a data size of the downlink data.

8. The control apparatus according to claim 7, wherein, to determine the paging area, the at least one processor is further configured execute the instructions to determine a size of the paging area based on a size of the downlink data.

9. The control apparatus according to claim 1, wherein the at least one processor is further configured to execute the instructions to receive a notification that indicates the attribute value of the downlink data from a transfer node receiving the downlink data.

10. The control apparatus according to claim 9, wherein the at least one processor is further configured to execute the instructions to determine the paging area in response to receiving the notification.

11. The control apparatus according to claim 1, wherein the at least one processor is further configured to execute the instructions to use different attribute types in determining a paging area for different mobile stations.

12. The control apparatus according to claim 1, wherein the at least one processor is further configured to execute the instructions to select the attribute type from a plurality of attribute types attributes relating to the downlink data based on registration information relating to the mobile station received from the subscriber server.

13. The control apparatus according to claim 1, wherein the at least one processor is further configured to execute the instructions to:
identify a location registration area to which the mobile station belongs; and
determine, as the paging area, an area that is within the location registration area.

14. The control apparatus according to claim 13, wherein the at least one processor is further configured to execute the instructions to:
select at least one base station or cell within the location registration area; and
determine, as the paging area, the selected at least one base station or cell.

15. A paging area control method performed by a paging control apparatus, the method comprising:
transmitting, by at least one processor of the paging control apparatus, a query to a subscriber server;
receiving, by the at least one processor, a response from the subscriber server;
based on the response, selecting, by the at least one processor, an attribute type to be used in determining a paging area from a plurality of attribute types relating to downlink data, the downlink data being received by a transfer node;
determining, by the at least one processor, an attribute value corresponding to the selected attribute type of the downlink data addressed to a mobile station; and
determining, by the at least one processor, a paging area of the mobile station based on the attribute value.

16. The method according to claim 15, wherein the selected attribute type of the downlink data is separated from an identifier of the mobile station as a destination of the downlink data.

17. The method according to claim 15, wherein the determining of a paging area includes:
   selecting an algorithm used for determining the paging area based on the attribute value of the downlink data; and
   determining the paging area using the selected algorithm.

18. The method according to claim 15, wherein the selected attribute type of the downlink data includes a data type.

19. The method according to claim 15, wherein the selected attribute type of the downlink data includes at least one of a protocol type and a port number.

20. The method according to claim 15, wherein the selected attribute type of the downlink data includes a transmission source identifier.

21. The method according to claim 15, wherein the selected attribute type of the downlink data includes a data size of the downlink data.

22. The method according to claim 21, further comprising determining a size of the paging area based on a size of the downlink data to determine the paging area.

23. The method according to claim 15, further comprising receiving a notification that indicates the attribute value of the downlink data from a transfer node receiving the downlink data.

24. The method according to claim 23, wherein the paging area is determined in response to a reception of the notification.

25. The method according to claim 15, wherein different attribute types are used in determining a paging area for different mobile stations.

26. The method according to claim 15, wherein the attribute type is selected from a plurality of attribute types based on registration information for the mobile station received from the subscriber server.

27. The method according to claim 15, further comprising:
   identifying a location registration area to which the mobile station belongs; and
   determining, as the paging area, an area that is within the location registration area.

28. The method according to claim 27, further comprising:
   selecting at least one base station or cell from base stations or cells within the location registration area; and
   determining, as the paging area, the selected at least one base station or cell.

29. A mobile communication system comprising:
   a transfer node having at least one hardware processor configured to execute instructions to receive downlink data addressed to a mobile station;
   a mobility management node having at least one hardware processor configured to execute instructions to determine a paging area of the mobile station; and
   a base station configured to transmit a paging signal into the paging area, wherein the paging signal is configured to page the mobile station, wherein
   the at least one hardware processor in the mobility management node is further configured to execute the instructions to:
      transmit a query to a subscriber server;
      receive a response from the subscriber server;
      select, based on the response, an attribute type to be used in determining a paging area, the attribute type being selected from a plurality of attribute types relating to downlink data;
      determine an attribute value corresponding to the selected attribute type of the downlink data received by the packet transfer node and addressed to the mobile station; and
      determine a paging area of the mobile station based on the attribute value.

30. The system according to claim 29, wherein the selected attribute type of the downlink data is separated from an identifier of the mobile station as a destination of the downlink data.

31. The system according to claim 29, wherein the at least one hardware processor of the mobility management node is further configured to execute the instructions to:
   select an algorithm used for determining the paging area based on the attribute value of the downlink data; and
   determine the paging area using the selected algorithm.

32. The system according to claim 29, wherein the at least one hardware processor of the transfer node is further configured to execute the instructions to transmit a notification indicating the attribute value of the received downlink data to the mobility management node, in order to request paging of the mobile station.

33. The system according to claim 32, wherein the at least one hardware processor of the mobility management node is further configured to execute the instructions to determine the paging area in response to a reception of the notification.

34. The system according to claim 29, wherein the selected attribute type of the downlink data includes at least one of a data type, a protocol type, a port number, transmission source identifier, and a data size.

35. The system according to claim 29, wherein the at least one hardware processor of the mobility management node is further configured to execute the instructions to use different attribute types in determining a paging area for different mobile stations.

36. The system according to claim 29, wherein the at least one hardware processor of the mobility management node is further configured to execute the instructions to select the attribute type from the plurality of attribute types based on registration information relating to the mobile station received from the subscriber server.

37. A non-transitory computer readable medium that stores a program for causing a computer to perform a paging area control method, the method comprising:
   transmitting, by at least one processor of the paging control apparatus, a query to a subscriber server;
   receiving, by the at least one processor, a response from the subscriber server;
   selecting, based on the response, an attribute type to be used in determining a paging area, the attribute type being selected from a plurality of attribute types relating to downlink data, the downlink data being received by a transfer node;
   determining an attribute value corresponding to the selected attribute type of the downlink data addressed to a mobile station; and
   determining a paging area of a mobile station based on the attribute value.

* * * * *

UNITED STATES PATENT AND TRADEMARK OFFICE
CERTIFICATE OF CORRECTION

| | |
|---|---|
| PATENT NO. | : 9,661,607 B2 |
| APPLICATION NO. | : 14/372312 |
| DATED | : May 23, 2017 |
| INVENTOR(S) | : Takanori Iwai |

It is certified that error appears in the above-identified patent and that said Letters Patent is hereby corrected as shown below:

In the Claims

In Claim 8, Column 14, Line 16:
"configured execute" should read --configured to execute--.

In Claim 12, Column 14, Line 35:
"attribute types attributes relating" should read --attribute types relating--.

Signed and Sealed this
First Day of August, 2017

Joseph Matal
*Performing the Functions and Duties of the*
*Under Secretary of Commerce for Intellectual Property and*
*Director of the United States Patent and Trademark Office*